UNITED STATES PATENT OFFICE.

DAVID THAIN AND WM. JACKSON, OF PHILADELPHIA, PENNSYLVANIA.

IMPROVEMENT IN OBTAINING FATTY MATTERS FROM RESIDUES.

Specification forming part of Letters Patent No. 26,799, dated January 10, 1860.

*To all whom it may concern:*

Be it known that we, DAVID THAIN and WILLIAM JACKSON, both of the city of Philadelphia, in the county of Philadelphia and State of Pennsylvania, have invented a mode of extracting fatty acids and other fatty matters from the residuum known as "acid bottoms," obtained in the manufacture of stearic acid, by what is known as the "sulphuric-acid process;" and we do hereby declare that the following is a full, clear, and exact description of the same.

In the manufacture of stearic acid by what is known as the "distilling" process the oil, tallow, or other crude fatty matter, after being washed or otherwise purified, is put into what is called the "acidifying-pan," and therein subjected to the action of sulphuric acid and heat, and when thoroughly "acidified," as it is termed, the fat is drawn off from the pan to be distilled, leaving therein the black residuum known as "acid bottoms." This residuum has been known to contain a considerable quantity of fatty matter, and attempts have been made to extract it by various means; but none have been found to pay. Attempts have been made to convert the said residuum to various useful purposes.

Our invention consists in obtaining the fatty acid or other fatty matter remaining in such residuum by distilling it in contact with superheated steam.

To enable others skilled in the art to make and use our invention, we will proceed to describe the manner in which it is to be performed.

The apparatus we employ is an ordinary still, which may be of any known form, provided at or near the top with a door, man-hole, or other means of introducing the substance, and provided with another door or man-hole at the bottom for withdrawing the residuum after distillation. The head of this still is connected with a worm or condenser. It is heated by a fire under its bottom, and is furnished with a perforated pipe to introduce jets of superheated steam into and among the charge during the distilling process.

The still is heated for the distilling process by a fire below it to a temperature of about 800° Fahrenheit, and superheated steam at about from 400° to 500° Fahrenheit is admitted freely during the whole process. The steam and fatty vapor are eliminated from the acid bottoms by the heat of the still, and both pass together to the condenser, where both are condensed and caused to separate by the difference of their specific gravities. The distillation is continued till it is ascertained that all the fatty acids or other fatty matter has been evaporated, when the door at the bottom of the still is opened and the residuum drawn out, preparatory to the introduction of a new charge.

We do not claim the use of such residuary matter as is herein specified, in connection with the distillation of coal-oil by superheated steam; but

What we claim as our invention, and desire to secure by Letters Patent, is—

Obtaining the fatty acid and other fatty matter remaining in the acid bottoms by distillation in contact with superheated steam, substantially as herein described.

DAVID THAIN.
WILLIAM JACKSON.

Witnesses:
F. A. MANDERFIELD,
MORRIS J. NAGLE.